3,103,525
PROCESS FOR HYDROGENATING IRON SUB-
GROUP METAL CYCLOPENTADIENYL COM-
POUNDS
Thomas H. Coffield, Heidelberg, Germany, and Kryn G.
Ihrman, Farmington, Mich., assignors to Ethyl Cor-
poration, New York, N.Y., a corporation of Virginia
No Drawing. Filed Sept. 18, 1959, Ser. No. 840,793
11 Claims. (Cl. 260—429)

This invention relates to a chemical process for pre-
paring organometallic compounds. More specifically,
this invention relates to a process for forming organo-
metallic compounds in which an aromatic-metal-cyclo-
pentadienyl compound is reduced to form a compound
in which both an aromatic molecule and a cyclopentadiene
molecule are bonded to the metal atom.

An object of this invention is to provide a process
for forming organometallic compounds. A further ob-
ject is to provide a new process in which an aromatic-
metal-cyclopentadienyl compound, either neutral or ionic,
is reacted with reducing agent to form compounds in
which both an aromatic molecule and a cyclopentadiene
molecule are bonded to a single metal atom. A more
specific object is to provide a process in which are pro-
duced organometallic compounds of metals selected from
the group consisting of manganese, technetium, rhenium,
iron, ruthenium and osmium having both an aromatic
molecule and a cyclopentadiene molecule coordinated
with a single metal atom. Further objects will become
apparent by a reading of the specification and claims which
follow.

This invention involves the formation of organometallic
compounds in which an aromatic molecule and a cyclo-
pentadiene molecule are coordinated with a single metal
atom. This involves a process in which an aromatic-
metal-cyclopentadienyl compound, either neutral or ionic,
is reacted with a reducing agent. The starting materials
are aromatic-metal-cyclopentadienyl compounds of met-
als selected from the group consisting of manganese,
technetium, rhenium, iron, ruthenium and osmium.

The compounds produced by our process contain an
aromatic molecule and a cyclopentadiene molecule which
are both coordinated with a single metal atom selected
from the above group. For best results, the preferred
aromatic molecule coordinated with the metal atom is a
compound containing an isolated benzene nucleus, es-
pecially those which are free of aliphatic unsaturation
on a carbon atom adjacent the benzene ring. Further,
they do not contain unsaturation on a carbon atom of
a fused ring which carbon atom is adjacent the benzene
nucleus. The benzene nucleus may be substituted with
a wide variety of substituent groups such as alkyl, aryl,
cycloalkyl, ether groups, halogen groups such as fluoro,
chloro and bromo groups, hydroxy groups, amine groups,
and the like. Of the aromatic compounds, those hav-
ing from 6–18 carbon atoms are generally preferred.
Typical of such compounds are mesitylene, benzene,
toluene, biphenyl, tetralin, m-hexyl-biphenyl, p-cresol
methyl ether, aniline, o-, m-, and p-toluidine, N,N-di-
methyl aniline, methyl benzoate, ethyl phenylacetate, fluo-
robenzene, chlorobenzene and bromo benzene, benzyl al-
cohol, acetophenone, hexamethyl benzene and the like.

However, aromatic compounds which do not have an
isolated benzene nucleus as well as those having aliphatic
unsaturation on a carbon atom adjacent to the benzene
ring may also be bonded to the metal atom in the com-
pounds formed by our process. Typical examples of
such aromatic molecules are styrene, methyl styrene,
naphthalene, anthracene, 1-ethyl naphthalene and the like.

The cyclopentadiene molecule bonded to the metal atom
in the compounds formed by our process may be sub-
stituted with various substituents and preferably con-
tains from five to about 13 carbon atoms. Typical of
the substituents which may be present on the cyclopenta-
diene molecule are alkyl groups such as methyl, ethyl,
propyl, n-butyl, tert-butyl, hexyl, octyl and the like.
The substituent groups may be aryl radicals such as
benzyl, p-methylphenyl and the like. Also the substituent
groups may be cycloaliphatic groups such as cyclohexyl
and cyclopentyl; alkenyl groups such as propenyl, butenyl,
and pentenyl, and cycloalkenyl radicals such as cyclo-
hexenyl, cyclopentenyl and the like. In addition, the
cyclopentadienyl molecule may be substituted with groups
containing hetero atoms such as halogens, amines and
the like. Typical of such groups are trichloromethyl,
fluoro, dimethylamino, dihexylamino and the like.

As stated previously, our process involves reduction of
an organometallic compound in which both an aromatic
molecule and a cyclopentadienyl radical are coordinated
with a metal atom of the manganese or iron group in
the periodic table. Typical of these organometallic
compounds which can be used as reactants in our proc-
ess are methylcyclopentadienyl biphenyl ruthenium chlo-
ride, trichloromethylcyclopentadienyl bromobenzene os-
mium bromide, mesitylene methylcyclopentadienyl man-
ganese, anthracene cyclopentadienyl technetium, β-phenyl-
ethylbenzene benzylcyclopentadienyl rhenium, anisole
dimethylaminocyclopentadienyl iron chloride, acetophe-
none propenylcyclopentadienyl manganese, hexamethyl-
benzene cyclohexylcyclopentadienyl technetium, dimethyl-
aniline chlorocyclopentadienyl ruthenium iodide and
methylbenzoate p-methylphenylcyclopentadienyl osmium
chloride. When reduced, according to our process, the
above compounds yield respectively methylcyclopenta-
diene ruthenium biphenyl, trichloromethylcyclopentadiene
osmium bromobenzene, mesitylene manganese methyl-
cyclopentadiene, anthracene technetium cyclopentadiene,
β-phenylethylbenzene rhenium benzylcyclopentadiene, an-
isole iron dimethylaminocyclopentadiene, acetophenone
manganese propenylcyclopentadiene, hexamethylbenzene
technetium cyclohexylcyclopentadiene, dimethylaniline
ruthenium chlorocyclopentadiene and methylbenzoate os-
mium p-methylphenylcyclopentadiene.

In the compounds produced by our process, the aro-
matic molecule contributes six bonding electrons to the
metal atom. Each carbon atom of the aromatic ring is
bonded, apparently by coordinate covalence, in such a
manner that the ring contributes six electrons to the
metal atom. The cyclopentadiene molecule contributes
four bonding electrons to the metal atom. These elec-
trons were originally the electrons present in the two
double bonds of the cyclopentadiene molecule. Each
double bond contributes two electrons for bonding to
the metal atom, thus giving a total of four electrons for
bonding from each cyclopentadiene molecule.

In the compounds produced by our process, the metal
atom has an electron configuration varying from two less
than up to and including the electron configuration of
the next higher rare gas in the periodic table. The pre-
ferred compounds produced by our process are those in
which the metal atom has the electron configuration of
the next higher rare gas. These compounds are more
stable and are more soluble in hydrocarbons. These
characteristics, stability and hydrocarbon solubility, make
those compounds, where the metal attains rare gas con-
figuration, best suited for use as fuel and as lube additives,
such as antiknock additives to hydrocarbon fuels.

Preferred reactants are the aromatic metal cyclopenta-
dienyl compounds of iron, ruthenium and osmium. These
iron group metals require the donation of 10 electrons
to the metal atom in order to achieve rare gas configura-
tion. Donation of six electrons from an aromatic molecule and four electrons from a cyclopentadiene molecule gives a total donation of 10 electrons and results in rare gas configuration for these compounds.

Our process includes several embodiments. The first comprises reaction of an aromatic metal cyclopentadienyl compound as defined above with an alkali metal amalgam in the presence of a hydrolytic solvent. The alkali metal amalgam may comprise, for example, sodium, lithium or potassium amalgamated with mercury. The solvent is hydrolytic; that is, it contains a replaceable hydrogen atom. A preferred form of this embodiment involves the preparation of aromatic-metal-cyclopentadiene compounds as defined above in which the cyclopentadiene moiety is substituted only with hydrogen or a hydrocarbon substitutent.

In this embodiment, it is essential that the solvent contain a replaceable hydrogen atom since in the reduction of the aromatic-metal-cyclopentadienyl compound a source of hydrogen is required to convert the cyclopentadienyl radical to cyclopentadiene. Typical of such hydrolytic solvents are the alcohols. Preferably the alcohol solvent is a monohydric alcohol having from one to four carbon atoms. Examples of such alcohols are methyl alcohol, ethyl alcohol, propyl alcohol and butyl alcohol.

In conducting our process according to this embodiment, the temperature employed may range between about —78° to about 100° C. Preferably, the temperature is maintained between about 0° to about 35° C. during the reaction since within this range best yields of product are obtained with a minimum of undesirable side reactions occurring. The pressure employed is not critical and pressures up to 100 atmospheres or even more can be used. Preferably, however, the pressure is maintained between about atmospheric pressure and about five atmospheres.

A protective atmosphere is preferably employed in the reaction vessel since this prevents decomposition of the reactants or products. Typical of the inert gases which may be used as a protective atmosphere are nitrogen, argon, helium, krypton and neon. The reaction mixture is preferably agitated so that the reactants are intimately dispersed. This is extremely desirable since without agitation the reactants cannot contact each other sufficiently to maintain an even reaction rate.

In general, the time required for the reaction varies between about 30 minutes and about 12 hours. The time requirement is not critical, however, since it will vary with the reaction temperature and the quantities of reactants used. If the reaction temperature is high and certain of the reactants are used in excess the reaction time will be relatively short. Conversely, if a low reaction temperature is employed and the reactants are used in stoichiometric quantities, the reaction time will be longer.

In general, an excess of alkali metal amalgam is utilized. For each mole of metal reactant, there are preferably employed from about three to about six moles of alkali metal amalgam. Greater or lesses quantities of alkali metal amalgam can be employed although generally this decreases the efficiency of the process.

The composition of the alkali metal amalgam generally comprises between about two to about five percent by weight of alkali metal. Greater or lesser quantities of alkali metal can be employed in the amalgam but the use of such quantities may reduce the effectiveness of the process. For example, if the concentration of alkali metal is less than two percent, the reaction rate may be decreased because of the decreased contact between the alkali metal and the aromatic-metal-cyclopentadienyl reactant. When the alkali metal content in the amalgam is higher than five percent, some alkali metal may be present in an unamalgamated form. At such concentrations, the alkali metal may, in a free form, react with explosive violence if water is present in the system. This result is undesirable since in some instances water is employed in the process.

As stated above, the preferred solvent for use in the first process embodiment is an alcohol containing from about one to about four carbon atoms. Such alcohols are hydrolytic and supply hydrogen for the reaction. Other hydrolytic solvents may be employed, however. For example, a mixed solvent comprising up to about 10 percent by weight of water admixed with an alcohol can be employed. Other mixed solvents which can be employed are those containing up to about 10 percent by weight of water admixed with a highly polar ether such as tetrahydrofuran, ethylene glycol dimethylether, ethylene glycol diethylether, ethylene glycol dibutylether, diethylene glycol dimethylether, diethylene glycol diethylether, diethylene glycol dibutylether and the like.

Other mixed solvents which can be used are those comprising 10 percent or higher by weight of an alcohol containing from about one to about four carbon atoms mixed with a neutral hydrocarbon solvent. Typical of the hydrocarbon solvents with which the alcohol can be admixed are the aliphatic hydrocarbons such as n-hexane, n-octane, isooctane, n-heptane, various isomers of hexane, octane and heptane, or mixtures of the above. Other suitable neutral solvents are the cycloaliphatic hydrocarbons such as cyclohexane or methylcyclohexane. Straight and branched chain olefins such as isoheptene, isooctene, and isoheptene, are also applicable. Aromatic hydrocarbon solvents such as benzene, toluene, ethylbenzene and xylene, either mixed or pure, may also be used.

Other solvents which can be employed are mixtures comprising 10 percent or more by weight of an alcohol, as defined above, admixed with an ether solvent. Typical of such ether solvents are the cyclic ethers such as tetrahydrofuran and 1,3-dioxane. Non-cyclic monoethers such as diethylether, diisopropylether and diphenylether are also applicable. Other ethers which may be used are ethylene glycol dimethylether, ethylene glycol diethylether, diethylene glycol dimethylether, diethylene glycol diethylether, and the like.

The amount of solvent used in the process is not critical. Generally, however, sufficient solvent is employed to dissolve the aromatic-metal-cyclopentadienyl reactant. Use of less solvent than this amount is permissible so long as a fluid reaction mass is maintained. Use of a great excess of solvent does not unduly hinder the process but its use generally achieves no purpose. Use of a large excess of solvent dilutes the reaction mass and thereby diminishes the reaction rate; extra process equipment is required to handle increased solvent throughput, and valuable solvent may be lost through increased evaporation, leakage, etc.

The other process embodiments of our invention involve the use of a reductant other than an alkali metal amalgam. A second process embodiment involves the use of a simple or complex alkali metal hydride as the reductant. This embodiment is preferred over our other process embodiments since it gives better yields of product. Examples of such hydrides are sodium borohydride, lithium aluminum hydride, lithium borohydride, potassium borohydride, magnesium bis(aluminum hydride), sodium trimethoxy borohydride, sodium hydride, lithium hydride, cesium hydride, rubidium hydride, potassium hydride and the like. The complex alkali metal borohydrides are preferred hydrides for reducing the aromatic-metal-cyclopentadienyl compounds, as defined above, when the cyclopentadienyl moiety contains substituents other than carbon and hydrogen that are easily reduced. The borohydrides are milder reducing agents than other of the alkali metal hydrides. Their use thereby enables reduction of the aromatic-metal-cyclopentadienyl compound to an aromatic-metal-cyclopentadiene compound without reducing the substituents containing atoms other than carbon and hydrogen.

When using a simple or complex alkali metal hydride as the reductant, any neutral solvent may be employed in our process. Hydrolytic solvents, as previously defined, may also be employed. These hydrolytic solvents are preferred for use in this embodiment since they have most excellent solvent properties for the reactants employed. Certain of the alkali metal hydrides are extremely reactive, however, and in some cases it is not desirable to use water in a weight concentration up to 10 percent of the solvent mixture. For example, when using sodium hydride as the reductant, we prefer to maintain the water concentration at less than 2 percent by weight. Selection of a solvent that is not too reactive with the alkali metal reductant is within the skill of the art when practicing our process. In our process, therefore, water, if present, can be adjusted to suit the reactivity of the alkali metal reductant.

Typical of the neutral solvents which may be employed in our second process embodiment are aliphatic hydrocarbons such as hexane, heptane, n-octane, n-nonane and the various isomeric forms of these hydrocarbons. Also cycloaliphatic hydrocarbons are applicable such as cyclohexane, methyl cyclohexane and the like. Aromatic solvents such as toluene, benzene and xylenes either pure or mixed can be used.

Ether solvents such as ethyl octylether, ethyl hexylether, diethylene glycol diethylether, diethylene glycol dimethylether, diethylene glycol dibutylether, ethylene glycol dimethylether, ethylene glycol diethylether, ethylene glycol dibutylether, dioxane and the like are suitable. Silicone oils such as the dimethyl polysiloxanes, methyl phenyl polysiloxanes, di-(chlorophenyl) polysiloxanes, hexapropyl disilane and diethyldipropyldiphenyldisilane may also be employed.

Included also are pentyl butanoate, ethyl decanoate, ethyl hexanoate and ester solvents derived from polyacids such as succinic, malonic, glutaric, adipic, pimelic, suberic, azelaic, sebacic and pinic acids. Specific examples of the diesters are di-(2-ethylhexyl) adipate, di-(2-ethylhexyl) azelate, di-(2-ethylhexyl) sebacate, di-(methylcyclohexyl) adipate and the like.

The temperature at which the reaction may be carried out when using an alkali metal hydride ranges from about −78° C. to about 100° C. Preferred temperatures are between about 0 to about 50° C. since within this range yields are maximized and undesirable side reactions are minimized. The progress is preferably carried out under an atmosphere of an inert gas such as nitrogen, argon, krypton or neon. Agitation is preferably employed in the process since it insures intimate contacting of the reactants and a steady reaction rate. The process pressures are not critical and up to 100 atmospheres of inert gas pressure can be used. Preferably pressures ranging from about one to about 5 atmospheres are employed.

From about one to about 6 moles of alkali metal hydride are generally employed for each mole of aromatic-metal-cyclopentadienyl compound. Greater or lesser quantities of alkali metal hydride can be used but in general the reaction works best within the above specified range. The amount of solvent employed is not critical but in general sufficient solvent is employed to dissolve the aromatic-metal-cyclopentadienyl reactant. Use of a large excess of solvent does not greatly hinder the reaction but in general is avoided. It may result in solvent loss and a slower reaction rate due to decreased contact between the reactants.

A third embodiment of our process involves the use of an alkali metal as the reductant. In using an alkali metal as the reductant, a preferred form of our process involves reduction of an aromatic-metal-cyclopentadienyl reactant in which the cyclopentadienyl moiety is substituted only with hydrogen or a hydrocarbon substituent. Our third embodiment is closely related to our second embodiment utilizing an alkali metal hydride reductant. In general, the same conditions apply to this embodiment as apply to reduction via an alkali metal hydride. One point of difference is that reduction with the alkali metal requires, as in the case of the alkali metal amalgam, a hydrolytic solvent as previously set forth. Since the alkali metals, e.g., sodium, potassium, lithium, cesium and rubidium are somewhat more reactive than other reducing agents, some precautions must be taken as to the composition of the solvent employed. The alkali metals react vigorously with water and relatively high concentrations of water in the solvent should therefore be avoided. Water concentration in the solvent when using an alkali metal as a reductant should generally not exceed one percent by weight. Higher concentrations can be used but their use may make the reaction hard to control. To control the reaction rate the hydrolytic solvent containing water or an alcohol as previously defined, can have additional inert solvent added to it. Since many of the alkali metals react very rapidly with alcohols, high alcohol concentrations should be avoided since they will make the reaction difficult to control. The use of the higher alcohols, e.g., butyl or propyl, is frequently advantageous in the process. Since the higher alcohols are less reactive with the alkali metal, they can be employed with less risk of letting the reaction rate get out of hand.

A fourth process embodiment differing slightly from the previous embodiments involves the reaction of an aromatic-metal-cyclopentadienyl compound as previously defined with hydrogen in the presence of a neutral solvent and a hydrogenation catalyst. Typical hydrogenation catalysts such as Raney nickel, platinum, palladium, and copper chromite can be used. The catalyst is generally employed in a small amount ranging up to a maximum concentration of about 30 percent by weight of the aromatic metal cyclopentadienyl compound to be reduced. Ordinarily excess hydrogen is employed. Use of excess hydrogen tends to force the reaction to completion and thereby results in higher product yields in a shorter time period. In order to insure an excess of hydrogen, the reaction is preferably conducted under at least about one atmosphere of hydrogen pressure. Higher pressures up to about 5 atmospheres of hydrogen can be employed but in general pressures in the range of one atmosphere are preferred. Excess hydrogen which is not consumed in the reaction can be readily recovered and recycled to the reaction vessel. In this process embodiment a preferred mode of operation is the reduction of an aromatic-metal-cyclopentadienyl compound in which the cyclopentadienyl moieties are substituted only with hydrogen or a hydrocarbon substituent.

During the process the reaction mixture is preferably agitated. This results in intimate contacting of reactants and a smooth and even reaction rate. Reaction temperatures can range between 0 to about 100° C. Preferably the reaction temperature ranges between about 25 to about 50° C. Within this latter range yields of product are maximized while undesirable side reactions are minimized. The pressure employed is not critical and may range between about one to about 150 atmospheres of an inert gas. Higher pressures may be used although this is generally not advantageous.

This process embodiment does not require a solvent which is hydrolytic. Hydrogen is added directly to the reaction mixture and it is, therefore, not necessary that the solvent contain active hydrogen. Hydrolytic solvents may be employed, however, without adversely affecting the reaction. Typical neutral solvents which may be employed are aliphatic hydrocarbons such as hexane, heptane, n-octane, n-nonane and isomeric forms of the preceding hydrocarbons. Also applicable are cycloaliphatic hydrocarbons such as cyclohexane, methyl cyclohexane and the like. Aromatic solvents such as toluene, benzene and xylenes either pure or mixed can be used.

Ether solvents such as ethyl octylether, ethyl hexylether, diethylene glycol diethylether, diethylene glycol dimethylether, ethylene glycol diethylether, ethylene glycol dibutylether, dioxane and the like are suitable. Silicone oils such as dimethyl polysiloxanes, methyl phenyl polysiloxanes, di-(chlorophenyl) polysiloxanes, hexapropyl disilane and diethyldipropyldiphenyldisilane may also be employed.

Included also are pentyl butanoate, ethyl decanoate, ethyl hexanoate and ester solvents derived from polyacids such as succinic, malonic, glutaric, adipic, pimelic, suberic, azelaic, sebacic and pinic acids. Specific examples of the diesters are di-(2-ethylhexyl) adipate, di-(2-ethylhexyl) azelate, di-(2-ethylhexyl) sebacate, di-(methylcyclohexyl) adipate and the like. Also applicable are hydrolytic solvents as defined previously. Such solvents include the alcohols, e.g. methyl-, ethyl-, propyl-, and butyl alcohol, or water admixed with an alcohol, or a mixture of water and/or an alcohol with an inert organic solvent.

To further illustrate our process there are presented the following examples. In these examples, all parts and percentages are by weight unless otherwise indicated.

Example I

To a reaction vessel were added 6.5 moles of cyclopentadienyl mesitylene iron iodide, 860 moles of ethyl alcohol, and 555 moles of water. The reaction mixture was stirred and 13 moles of sodium borohydride were added thereto. At this point, a gas began to evolve from the reaction mixture. The mixture was stirred for 1½ hours at room temperature as a gentle evolution of gas continued. After stirring for one additional hour, the solvent was removed by distilling in vacuo. The brown residue was extracted twice with petroleum ether (boiling point 30–60° C.) and on evaporation, mesitylene iron cyclopentadiene, was obtained as a red oil. Analysis: Carbon, 68.9 percent; hydrogen, 7.40 percent, and iron, 23.0 percent. Calculated for mesitylene iron cyclopentadiene: C, 69.5; H, 7.45, and Fe, 23.3. The structure of the product was further confirmed by means of infrared analysis.

Example II

To a reaction vessel was added 0.18 mole of mesitylene iron cyclopentadienyl iodide, 12.9 moles of ethanol and .8 mole of sodium borohydride. The reaction vessel was flushed with nitrogen. During the course of the reaction, nitrogen was passed over the reaction mixture continuously. On addition of the reactants an immediate evolution of gas occurred. The reaction mixture was stirred and heated at reflux. After a few minutes of heating, the small amount of remaining solid had dissolved. The reaction mixture was heated at reflux with stirring for four hours. The reaction product was then discharged from the reaction vessel and filtered. The residue was washed with ethanol, and the washings were mixed with the filtrate. The filtrate was then heated under vacuum to remove the ethanol solvent. The remaining residues were distilled several times under vacuo to give mesitylene iron cyclopentadiene as a red oil. Calculated analysis for $C_{14}H_{18}Fe$: C, 69.5; H, 7.45, and Fe, 23.2. Found: C, 70.3; H, 7.70, and Fe, 23.1. The structure of the product, mesitylene iron cyclopentadiene, was further confirmed by infrared analysis.

Example III

Two one-hundredths mole of trichloromethylcyclopentadienyl technetium isopropylbenzene dissolved in a solvent comprising 10 percent water and 90 percent tetrahydrofuran is charged to an autoclave along with 0.03 mole of lithium in the form of a 3 percent lithium amalgam. The autoclave is pressurized with helium to 100 atmospheres. The autoclave is cooled to −78° C. and maintained at this temperature for 12 hours while the reaction mixture is stirred. It is then vented and the product is discharged. A good yield of trichloromethylcyclopentadiene technetium isopropylbenzene is obtained by removing solvent under vacuum, and chromatographing the residues dissolved in benzene.

Example IV

One mole of anisole cyclopentadienyl iron chloride dissolved in a solvent comprising 50 percent tetrahydrofuran and 50 percent benzene is charged to an evacuated autoclave along with one mole of lithium aluminum hydride. The vessel is pressurized to one atmosphere with nitrogen. The reaction mixture is stirred for 3 hours at 0° C. whereupon the autoclave is discharged. The product, anisole iron cyclopentadiene, is recovered in good yield by removing the solvent through heating under vacuum, dissolving the residues in petroleum ether, and chromatographing the ether extract.

Example V

Two moles of benzene ruthenium methylcyclopentadienyl bromide dissolved in methyl alcohol is charged to an evacuated autoclave along with 2 moles of sodium borohydride. The vessel is pressurized with nitrogen to one atmosphere. The mixture is stirred for 2 hours at 20° C. and the vessel is discharged. The product benzene ruthenium methylcyclopentadiene is recovered in good yield by removing the alcohol solvent in vacuum, dissolving the residues in petroleum ether and chromatographing the ether solution.

Example VI

One mole of trichloromethylcyclopentadienyl osmium m-xylene chloride mixed with benzene is charged to an evacuated autoclave along with 6 moles of sodium hydride. The autoclave is pressurized to 100 atmospheres with nitrogen and stirred for 30 minutes at 30° C. The vessel is then discharged and water is added to the reaction mixture. The mixture is filtered and the benzene layer is separated from the water layer. A good yield of trichloromethylcyclopentadiene osmium m-xylene is recovered from the benzene by means of chromatography followed by heating of the eluate under vacuum.

Example VII

One mole of cyclopentadienyl manganese toluene dissolved in absolute ethanol is charged to an evacuated autoclave along with 2 moles of lithium. The autoclave is then pressurized to one atmosphere with nitrogen and stirred for 3 hours at 15° C. The contents are then discharged and a good yield of toluene manganese cyclopentadiene is separated from the reaction product by chromatographing the toluene extract of the residues obtained on removal of the ethanol solvent.

Example VIII

One mole of octylcyclopentadienyl osmium 1,8-bis(isopropyloxycarbonyl) naphthalene bromide dissolved in sec-butyl alcohol is charged to an evacuated autoclave along with 3 moles of potassium. The autoclave is pressurized to 75 atmospheres with helium. The mixture is then stirred for 4 hours at 20° C. whereupon the vessel is discharged. A good yield of octylcyclopentadiene osmium 1,8-bis(isopropyloxycarbonyl) naphthalene is recovered by means of chromatography.

Example IX

Two moles of methylcyclopentadienyl manganese ethylbenzene dissolved in ethylether is charged to an autoclave which is pressurized to one atmosphere with hydrogen. One-tenth mole of platinum catalyst is added to the autoclave and stirring of the reaction mixture is commenced. The pressure in the autoclave is maintained at one atmosphere by feeding in hydrogen as the reaction progresses. When one mole of hydrogen has been fed to the autoclave, stirring is ceased and the autoclave is discharged. The product is filtered and the filtrate is reduced to dryness by heating under reduced pressure. The residues are purified by chromatography to give a good yield of ethylbenzene manganese methylcyclopentadiene.

Example X

One mole of cyclopentadienyl iron mesitylene iodide dissolved in benzene is charged to an autoclave pressurized to 5 atmospheres with hydrogen. Copper chromite is then added to the autoclave in an amount equal to 10 percent by weight of the cyclopentadienyl iron mesitylene iodide reactant. The reaction mixture is stirred at 50° C. until a pressure drop is noted which is equivalent to one mole of hydrogen being consumed in the reaction. Agitation is then stopped and the reaction vessel is discharged. A good yield of cyclopentadiene iron mesitylene iodide is obtained by chromatographic purification of the reaction mixture.

Example XI

One mole of trichloromethylcyclopentadienyl rhenium dimethylaniline dissolved in diethylene glycol dimethylether is charged to an autoclave pressurized with hydrogen to one atmosphere. Finely divided palladium catalyst is added which is equal to 2 percent by weight of the trichloromethylcyclopentadienyl rhenium dimethylaniline. The reaction mixture is stirred at 40° C. Pressure in the reaction vessel is maintained constant at one atmosphere by slowly adding hydrogen to the system as hydrogen is consumed in the reaction. When one-half mole of hydrogen has been added to the system in maintaining the pressure at one atmosphere, stirring is ceased and the reaction vessel is discharged. A good yield of trichloromethylcyclopentadiene rhenium dimethylaniline is obtained by removing the solvent in vacuum, dissolving the residues in benzene, chromatographing the benzene extract, and removing the benzene from the eluate by heating under vacuum.

The compounds produced by our process are found to have the properties of stability, volatility and hydrocarbon solubility which render them of particular utility as additives to liquid hydrocarbons. When such compounds are added to a liquid hydrocarbon fuel of the gasoline boiling range, an improvement in the characteristics of the fuel is evidenced.

The compounds produced by our process can be the sole additive in fuels and lubricating oils, or they can be present in admixture with other additive components such as scavengers, deposit-modifying agents containing phosphorus and/or boron, and also other antiknock agents such as tetraethyllead, etc.

The compounds can be added directly to the hydrocarbon fuels or lubricating oils and the mixtures subjected to stirring, mixing or other means of agitation until a homogeneous fluid results. Alternatively, the compounds of our invention may be first made up into concentrated fluids containing solvents, such as toluene, hexane and the like. There may be also present in said concentrated fluids other additives such as scavengers, antioxidants and other antiknock agents such as tetraethyllead. The concentrated fluids can then be blended with the fuels.

When another antiknock agent is present in the fuel or lubricant in admixture with a compound produced by our process, such antiknock agent is normally an organolead compound. Preferably, the organolead compounds are the hydrocarbon lead compounds such as tetraphenyllead, tetratolyllead and tetraalkyllead compounds such as tetramethyllead, tetrapropyllead, tetraethyllead and the like.

In formulating hydrocarbon fuels of the gasoline boiling range, there can be present in said fuels from about 0.015 to about 10 grams of metal per gallon as a compound produced by our process. Preferably, there are contained in the fuel from about 0.02 to about six grams of metal per gallon as such a compound. In addition, the fuels can contain organolead antiknock agents in a weight concentration from about 0.02 to about 13.2 grams of lead per gallon.

Where halohydrocarbon compounds are employed as scavenging agents, the amounts of halogen used are given in terms of theories of halogen. A theory of halogen is defined as the amount of halogen which is necessary to react completely with the metal present in the antiknock mixture to convert it to the metal dihalide as, for example, lead dihalide and manganese dihalide. In other words, a theory of halogen represents two atoms of halogen for every atom of lead and/or manganese present. In like manner, a theory of phosphorus is the amount of phosphorus required to convert the lead present to lead orthophosphate, $Pb_3(PO_4)_2$. That is, a theory of phosphorus based on lead represents an atom ratio of two atoms of phosphorus to three atoms of lead. When based on manganese, a theory of phosphorus likewise represents two atoms of phosphorus for every three atoms of manganese; that is, sufficient phosphorus to convert manganese to manganese orthophosphate, $Mn_3(PO_4)_2$. Similar considerations apply to the other metals.

When employing the compounds produced by our process together with scavengers, an antiknock fluid for addition to hydrocarbon fuels is prepared comprising an aromatic-metal-cyclopentadiene coordination compound together with various scavengers such as halogen-containing organic compounds having from two to about 20 carbon atoms in such relative proportions that the atom ratio of metal-to-halogen is from about 50:1 to about 1:12. The halogen scavenger compounds can be halohydrocarbons, both aliphatic and aromatic in nature, or a combination of the two with halogens being attached to carbons either in the aliphatic or the aromatic portions of the molecule. The scavenger compounds may also be carbon, hydrogen, and oxygen-containing compounds, such as haloalkyl ethers, halohydrins, haloesters, halonitro compounds, and the like. Still other examples of scavengers that may be used in conjunction with the compounds produced by our process, either with or without hydrocarbolead compounds, are illustrated in U.S. Patents 2,398,281 and 2,479,900–903. Mixtures of different scavengers may also be used. These fluids can contain other components as stated hereinabove. In like manner, fluids are prepared containing from 0.01 to 1.5 theories of phosphorus in the form of phosphorus compounds. To make up the finished fuels, the concentrated fluids are added to the hydrocarbon fuel in the desired amounts and the homogeneous fluid obtained by mixing, agitation, etc.

The ratio of the weight of metal in the form of an aromatic-metal-cyclopentadiene compound to lead in fluids and fuels containing the two components can vary from about 1:880 to about 50:1. When no lead is present, the latter figure becomes 1:0. A preferred range of ratios, however, is from about 1:63 to about 30:1.

The following examples are illustrative of fluids and fuels containing the new compounds produced by our process.

Example XII

To 1000 gallons of a commercial fuel having an initial boiling point of 90° F. and a final boiling point of 406° F. is added 55 grams of mesitylene iron cyclopentadiene and the mixture subjected to agitation until the additive is distributed evenly throughout the fuel, in an amount equivalent to 0.0127 gram of iron per gallon of fuel.

The fuels to which these antiknock compositions are added may have a wide variation of compositions. These fuels generally are petroleum hydrocarbons and are usually blends of two or more components. These fuels can contain all types of hydrocarbons, including paraffins, both straight and branched chain; olefins; cycloaliphatics containing paraffin or olefin side chains; and aromatics containing aliphatic side chains. The fuel type depends on the base stock from which it is obtained and on the method of refining. For example, it can be a straight run or processed hydrocarbon, including thermally cracked, catalytically cracked, reformed fraction, etc. When used for spark-fired engines, the boiling range of the components of gasoline can vary from zero to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F., with certain fractions of the fuel boiling away at particular intermediate temperatures.

The metal coordination compounds produced by our process may be incorporated in paints, varnish, printing inks, synthetic resins of the drying oil type, oil enamels and the like, to impart excellent drying characteristics to such compositions. Generally speaking, from 0.01 to 0.05 percent of metal is beneficially employed as a dryer in such a composition.

For example, to a typical varnish composition containing 100 parts ester gum, 173 parts of tung oil, 23 parts of linseed oil and 275 parts of white petroleum naphtha is added 3.0 parts of toluene iron cyclopentadiene. The resulting varnish composition is found to have excellent drying characteristics. Good results are obtained when other drying oil compositions and other aromatic metal cyclopentadiene coordination compounds are employed.

Other important uses of the compounds produced by our process include the use thereof as chemical intermediates, particularly in the preparation of metal and metalloid containing polymeric materials. In addition, some of the aromatic metal cyclopentadiene compounds can be used in the manufacture of medicinals and other therapeutic materials, as well as agricultural chemicals such as, for example, fungicides, defoliants, growth regulants, and the like.

The physical properties of the compounds produced by our process are such as to make them very suitable for the utilities described above. For example, mesitylene iron cyclopentadiene exists as a red oil having moderate oxidative and thermal stability. The compound is volatile and distills slowly at room temperature at high vacuum. It is soluble in organic solvents such as petroleum ether, benzene, chloroform and ethanol and is likewise soluble in hydrocarbon fuels and lubricants.

Having fully described our process, the compounds produced by it, and their manifold utilities, we do not intend that our invention be limited except within the spirit and scope of the appended claims.

We claim:
1. Process for preparing a non-ionic organometallic compound of an iron subgroup metal from an ionic iron subgroup metal salt;
   said salt consisting of a cation and a halide anion, said cation consisting of one iron-subgroup metal atom bonded to a cyclopentadienyl radical and to an aromatic molecule;
      said cyclopentadienyl radical having 5 to about 13 carbon atoms and embodying the cyclic configuration found in cyclopentadiene and being selected from the class consisting of the cyclopentadienyl radical and hydrocarbon substituted cyclopentadienyl radicals wherein the hydrocarbon substituents are selected from the class consisting of alkyl, aryl and cycloalkyl groups;
      said aromatic molecule having an isolated benzene nucleus free of aliphatic unsaturation on a carbon atom adjacent to the benzene nucleus, and having 6 to 18 carbon atoms, said molecule being selected from the class consisting of benzene, anisole, and substituted benzenes wherein the substituent groups are selected from the class consisting of alkyl, aryl and cycloalkyl groups;
said process comprising reductively hydrogenating said ionic iron subgroup-metal salt by reacting said salt with hydrogen, said hydrogen being derived from a hydrogenating agent selected from the class consisting of
   (1) an alkali metal in the presence of a hydrolytic solvent selected from the class consisting of monohydric alcohols having 1 to 4 carbon atoms and a mixed solvent comprising up to about 1 percent by weight of water admixed with a monohydric alcohol having 1 to 4 carbon atoms;
   (2) an alkali metal amalgam in the presence of a hydrolytic solvent selected from the class consisting of monohydric alcohols having 1 to 4 carbon atoms and a mixed solvent comprising up to about 10 percent by weight of water admixed with a monohydric alcohol having 1 to 4 carbon atoms;
   (3) simple and complex metal hydrides selected from the class consisting of sodium borohydride, lithium aluminum hydride, lithium borohydride, potassium borohydride, magnesium bis(aluminum) hydride, sodium trimethoxy borohydride, sodium hydride, lithium hydride, cesium hydride, rubidium hydride, and potassium hydride;
   (4) and hydrogen in contact with a hydrogenation catalyst selected from the class consisting of Raney nickel, platinum, palladium and copper chromite;
so that an atom of hydrogen enters into the cyclopentadienyl radical to form the corresponding cyclopentadiene molecule and the metal atom is reduced to a valence state of one less than the valence of the metal atom in the ionic metal salt.

2. The process of claim 1 wherein the reducing agent is an alkali metal amalgam in the presence of a hydrolytic solvent selected from the class consisting of monohydric alcohols having one to four carbon atoms and a mixed solvent comprising up to about 10 percent by weight of water admixed with monohydric alcohol having 1 to 4 carbon atoms.

3. The process of claim 2 in which the reaction is carried out between about −78° C. and about 100° C.

4. The process of claim 3 wherein the reaction is carried out between about 0° C. and about 35° C.

5. The process of claim 4 wherein the process is carried out under an atmosphere of an inert gas.

6. The process of claim 5 in which said alkali metal amalgam contains between about 2 to about 5 percent by weight of alkali metal.

7. Process of claim 1 wherein the reducing agent is sodium borohydride.

8. Process for the preparation of mesitylene iron cyclopentadiene which comprises reacting cyclopentadienyl iron mesitylene iodide with a sodium borohydride.

9. Process of claim 1 wherein the reducing agent is an alkali metal in the presence of a hydrolytic solvent selected from the class consisting of monohydric alcohols having one to four carbon atoms and a mixed solvent comprising up to about 1 percent by weight of water admixed with monohydric alcohol having 1 to 4 carbon atoms.

10. Process of claim 1 wherein the reducing agent is hydrogen and said process is carried out in contact with a hydrogenation catalyst selected from the class consisting of Raney nickel, platinum, palladium and copper chromite.

11. The process of claim 10 wherein excess hydrogen reactant is employed.

References Cited in the file of this patent
UNITED STATES PATENTS
2,810,737   Haven _____ Oct. 22, 1957

(Other references on following page)

OTHER REFERENCES

Groggins, "Unit Processes," McGraw-Hill, 1952, Ch. VIII, "Hydrogenation," see pages 497–501.

Birmingham et al., "Naturwissenschafter," vol. 42, page 96 (1955).

Gaylord, "Reduction With Complex Metal Hydrides," Interscience Publishers, Inc., 1956, page 192.

Chem. Abstracts, vol. 52, page 5428, line $b$, April 10, 1958.

Hallam et al., J. Chem. Soc. (London), pages 642–660 (1958).

Rausch et al., Chemistry and Industry, July 25, 1959, pages 957–958.